April 22, 1952 H. M. NORMAN 2,594,203
DYNAMOELECTRIC MACHINE BALANCED ROTOR
Filed Jan. 29, 1948 2 SHEETS—SHEET 1
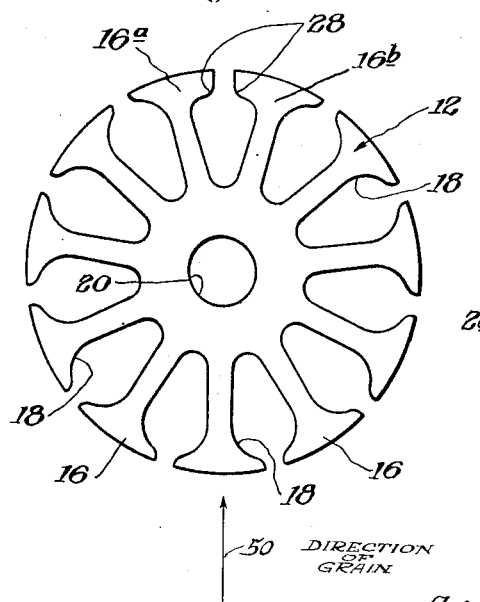
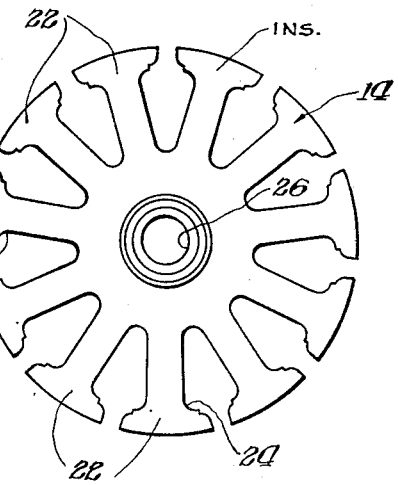
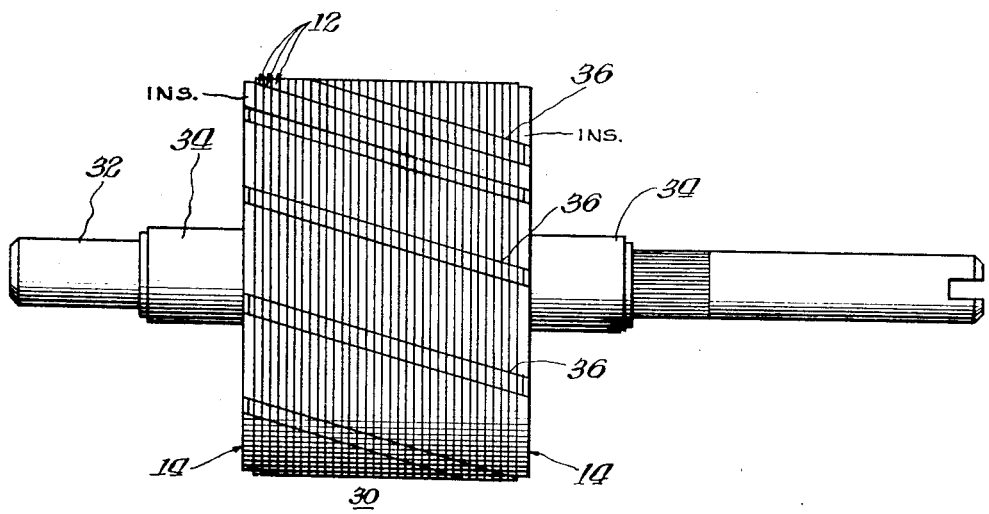
Inventor:
Horace M. Norman
By:
Hinkle, Horton, Ackeberg, Hanmann & Rupp
Attorneys.

April 22, 1952        H. M. NORMAN        2,594,203

DYNAMOELECTRIC MACHINE BALANCED ROTOR

Filed Jan. 29, 1948        2 SHEETS—SHEET 2

Inventor:
Horace M. Norman
By: Hinkle, Horton, Ahlberg, Hausman & Wupper
Attorneys Patented Apr. 22, 1952

2,594,203

UNITED STATES PATENT OFFICE 2,594,203

DYNAMOELECTRIC MACHINE BALANCED ROTOR

Horace M. Norman, Skokie, Ill., assignor to Stewart-Warner Corporation, Chicago, Ill., a corporation of Virginia Application January 29, 1948, Serial No. 5,062

3 Claims. (Cl. 171—206)

The present invention relates to rotors for electric motors, and more particularly to an improved core lamination and a method of assembling the laminations to form a rotor having improved static and, preferably, also dynamic balance. The present application is a continuation-in-part of my copending application Serial No. 700,701, filed October 2, 1946, now abandoned.

Lack of mechanical balance which is a common defect in rotors as presently constructed may be due to one or more of several causes and has resulted in the past in the resort to various expedients to secure the proper balance, such as the addition or subtraction of material at certain points on complete rotors to balance them.

Two of the primary causes for an unbalanced condition in a rotor are the lack of symmetry in the core windings and the fact that the stock from which the laminations of the core are made is often tapered across the grain so that one edge of the stock is thinner and lighter in weight than the other edge. A core made from laminations punched from tapered stock and stacked on the rotor shaft all in the same direction that they were punched is bound to be unbalanced.

According to the present invention, the effect of both of these factors can be offset by constructing a core from laminations slightly heavier at the region thereof where the core winding is lighter, so that the reduced weight of the winding at this region is balanced by the added weight of the laminations at that region of the core, and by stacking the laminations with the grain running in alternate directions, in a manner to be described in greater detail hereinafter.

A primary object of the invention is the provision of a new and improved laminated rotor for electric motors in which the core laminations at the region where the rotor coil windings are lighter are of increased weight relative to the weight of corresponding portions of the rest of the core lamination to compensate for the reduced weight of the rotor coils at this region in the assembled core and in which the core laminations are stacked together in such a manner that differences in weight along the periphery thereof due to unevenness in the stock from which they are cut is minimized.

Another object of the invention is the provision of a new and improved laminated rotor construction for electric motors having core laminations formed so that a slight increase in weight of the core is secured at the region thereof where the core winding is the lightest, which region may be where or near where the core winding is started.

A further object of the invention is the provision of a new and improved method of stacking core laminations which minimizes and can be used to eliminate substantially completely the unbalanced condition which might result from the fact that the core laminations are formed from stock which may taper from one side to the other. The method can be used, for the sake of standardization, on all stock, i. e., both tapered and untapered, so that, should the stock be tapered, the unbalance will be minimized or eliminated.

A still further object of the invention is the provision of a new and improved rotor for electric motors having an improved static and dynamic balance.

These and other objects of the invention will become apparent from the ensuing description in the course of which reference will be had to the accompanying drawings, in which:

Fig. 1 is a plan view of a single core lamination for the rotor of an electric motor;

Fig. 2 is a plan view of one of the end insulator laminations for a rotor core;

Fig. 3 is a side elevational view of the core laminations and end insulators assembled upon a rotor shaft ready to receive the winding;

Figure 4:
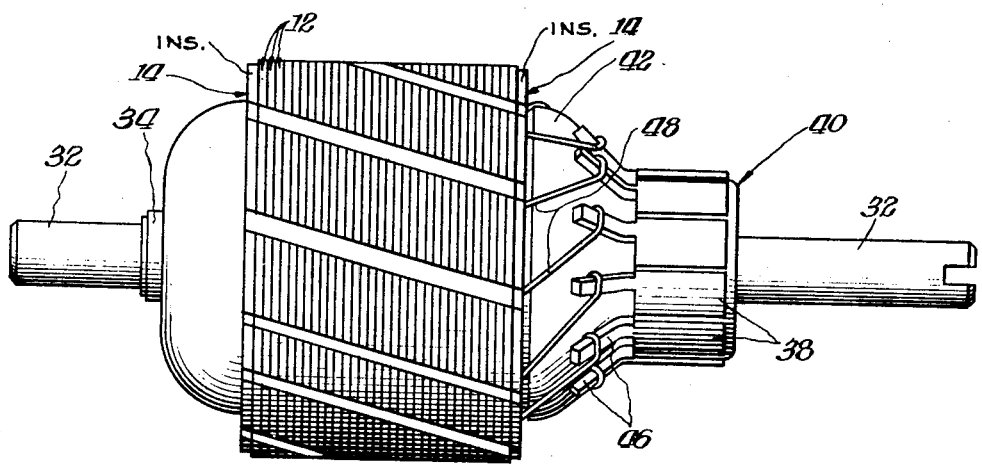
Fig. 4 is a side elevational view of a completed rotor constructed in accordance with the invention.
Figure 5:
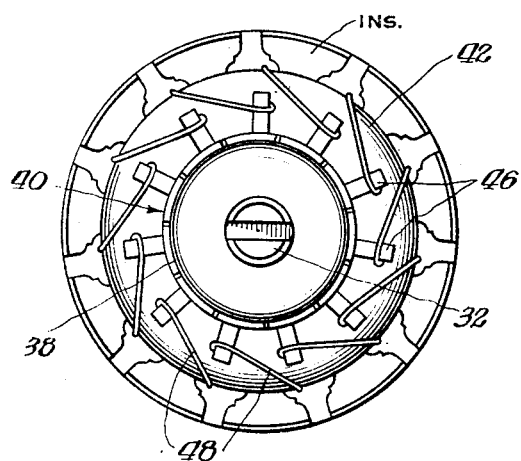
Fig. 5 is an end elevational view of an assembled rotor taken from the commutator end of the rotor.

The configurations of a rotor core lamination 12 and a rotor core end insulating lamination 14 from which a rotor core is built up are shown in Figs. 1 and 2, respectively. It will be noted that the illustrated core lamination 12 is circular in shape and with a series of equally spaced radially extending arms or teeth 16 which define a series of slots 18 between the adjacent edges of adjoining teeth. A central aperture 20 is also provided which should be accurately concentric with the periphery of the lamination.

The end insulators 14 are provided with a number of teeth 22 equal to the number of teeth on the core lamination 12, and these teeth define a series of slots 24 between the adjacent edges thereof. The end insulators are also provided with a central aperture 26 concentric with the periphery of the insulator.

In the illustrated embodiment of the invention, the slots 18 in the juxtaposed core laminations 12 of an assembled rotor and the slots 24 in the end insulators 14 receive the windings which form the rotor coils of the finished rotor so that the number of teeth and hence the number of slots in the laminations will be determined by the number of rotor coils with which the rotor is to be equipped and need not be limited to eleven as shown in the drawings.

All of the teeth 16 on the core laminations are of uniform shape so that they will be of uniform weight except the teeth which have been marked 16a and 16b. Portions of the adjacent edges of these two teeth are bulged outwardly slightly as compared with the corresponding edges of the other teeth on the laminations, as indicated at 28, so that the weight of the core in the region of these two teeth is increased slightly relative to the weight of the other teeth for a purpose which will be explained presently.

In an assembled core 30, as shown in Fig. 3, a plurality of core laminations 12 are secured in juxtaposed relation upon a rotor shaft 32 with the apertures 20 engaging over the shaft 32 and an end insulator 14 located at each end of the stack of core laminations. The core laminations are secured on the rotor shaft 32 in a conventional manner, such as by press fitting the same upon a knurled portion of the shaft. Sleeves 34 are secured to the shaft in abutting relation with laminations to make a convenient shoulder for locating the commutator at one end and a support for washers which take the end thrust at the other end.

When a plurality of core laminations 12 are being stacked to form an assembled core, the slots 18 formed between the adjacent teeth 16a and 16b of the different laminations are preferably, but not necessarily, arranged in aligned relation along a line which is skewed approximately 15 degrees from the normal so that a skewed transverse slot cell 36 adjacent the periphery of the core 30 is formed by the juxtaposed laminations 12, as seen in Fig. 3. Since all the other teeth 16 are uniform in shape and equally spaced from each other, they will also be positioned in aligned relation the same as the weighted teeth and will define other skewed slot cells 36 through the core. The slot cell formed between the weighted teeth 16a and 16b is preferably identified by marking the surface of the core along this slot cell with a layout fluid or other colored fluid, and this may be done as the laminations are stacked off the punched press on which they are formed.

As a result of the slightly increased weight of the core teeth 16a and 16b and the manner of stacking the laminations, the assembled unwound core is slightly heavier on one side than on the other. This added weight on teeth 16a and 16b is designed so that it is sufficient to offset the unbalance which has been found to be present in conventionally constructed rotors due to the lack of symmetry in the rotor coil windings, which unbalance generally has its resultant at or near the slot cell where the coil windings start and end. Should the winding be lightest at a region other than the slot, the added weight may be placed at that region. For example, the winding may be lightest at the region of a tooth. In this case, that tooth may be enlarged somewhat at both sides. In some cases, the region at which the winding is lightest may be displaced one slot away from where the winding begins and ends. In this case the winding can be started at the next slot so that the lightest region of the winding substantially coincides with the region of the core whereat weight is added.

The rotor may be wound in conventional manner and connected to segments 38 on a commutator 40 secured on one end of the rotor shaft 32 against the sleeve 34 and insulated from the shaft 32.

An insulating cap 42 is placed over the winding between the commutator and the end of the core to insulate the ends of the rotor coils, thereby better to insulate the leads that are soldered to the commutator.

The rotor core 30 shown in the drawings is provided with eleven rotor coils; hence, eleven segments 38 are provided on the commutator connected to separate binding posts 46 projecting from the commutators exteriorly of the cap 42. A separate lead 48 connects each binding post 46 to the junctions of the rotor coils.

Figure 6:
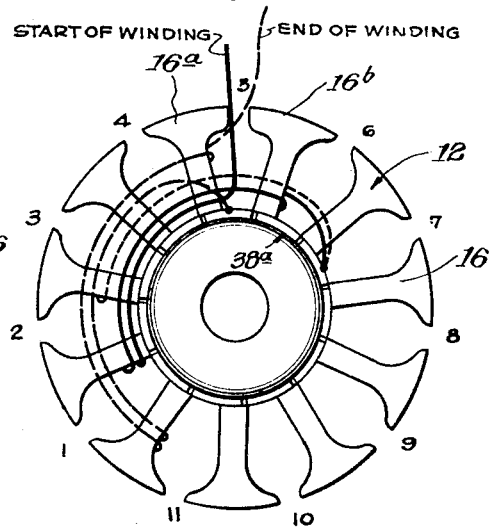
Fig. 6 is a diagrammatic view showing the manner in which the rotor coils of the rotor are wound upon the rotor core.

One manner of winding the rotor coil windings is illustrated diagrammatically in Fig. 6 in which the slots between the teeth have been numbered from one to eleven to simplify the explanation, the weighted teeth being indicated at 16a and 16b, as before. The commutator segment to which the starting end of the winding is connected is indicated at 38a and the winding for the first coil which is shown diagrammatically in full lines starts at the commutator side of the core and extends between and is laid in slots 1 and 6. Although only two turns have been shown, it will be understood that a rotor coil consists of a relatively large number of turns. However, only two are shown in order to eliminate confusion. The beginning of the second coil is shown in dotted lines and the winding forming this coil extends between and is laid in slots 2 and 7. The rest of the eleven coils are wound in a similar manner, and the eleventh and last coil, which is shown in dash lines, extends between and lies in the eleventh and fifth slots.

It has been found that by winding the coils in this manner with both the starting and the terminal ends of the winding in the slot cell 36 formed between the weighted teeth 16a and 16b, the winding is generally lighter in the region between these teeth. Thus, by making these teeth heavier, the resulting unbalance can be eliminated. However, as pointed out earlier, should the winding be lighter elsewhere than between the teeth, weight can be added elsewhere to achieve the desired compensation.

Another factor affecting the balance of a rotor arises as a result of certain peculiarities which may be present in the relatively thin sheet steel stock from which the core laminations 12 are formed. It has been found that such stock often has a slight taper across the grain of the stock so that it is thicker on one side than the other and, as a result, heavier on the thicker side. A series of the laminations punched in the same direction from this stock will of course each be heavier along one portion thereof and hence will be slightly unbalanced. If these laminations are all stacked in the same direction in which they were punched from the stock, the assembled core formed thereby will be unbalanced.

In accordance with one of the features of the present invention, the core laminations 12 for a rotor core are all punched in the same direction from the stock and then so arranged and secured as to minimize the unbalance resulting from any taper which may be present. Substantially complete elimination, if desired, and it usually is, can be attained by having substantially equal numbers of laminations with the taper extending in opposite directions. One way of doing this is to stack one group of adjacent laminations with the taper extending in one direction and another group of adjacent laminations with the taper extending in a direction 180 degrees removed from the direction of the taper in the first group. This can be done readily by collecting all the laminations in the same position as they come from a punch press. Then two groups of laminations are taken and one is so positioned relative to the other as to locate the heavy portions of the two groups 180 degrees from each other. In a construction including heavier teeth, like the teeth 16a and 16b of the present embodiment, this desired location can be readily obtained by punching the laminations so that these teeth are located along the grain (as indicated by the arrow 50 in Fig. 1) and then reversing one group relative to another about a line along the grain. This leaves the heavier teeth along the same line, but the heavy sides of laminations in one group are located opposite the lighter sides of laminations in the other group.

Both the static and dynamic unbalance of a core, such as the one described above, can be minimized and substantially eliminated by a further modification of the method of stacking in which the total number of laminations for a complete core is divided into two equal groups of adjacent laminations. One of the two groups is then divided into additional and preferably two equal groups, each consisting of a quarter of the total number of laminations. In stacking the laminations according to this method, one of the quarter groups is placed on each side of the half group with the taper in the quarter groups extending in a direction 180 degrees removed from the direction in which the taper extends in the half group of laminations.

Both static and dynamic unbalance can be minimized by reversing every other lamination so as to locate the heavier sides of adjacent laminations 180 degrees apart. If all the laminations are so arranged, the static and dynamic unbalances are completely eliminated. This reversal of alternate laminations can be effected by hand or a machine may be arranged to do it and preferably as the laminations are ejected from a punch press.

In all of these methods of stacking the added weight along one side of the core due to taper which may be present in the laminations is counterbalanced by the added weight of other laminations on the other side, so that the effect of the taper is offset. The unbalance not only can be minimized, but it can be substantially fully compensated. Should the stock be untapered at times, balancing would not be required, but the methods can be used as a standard practice.

From the foregoing detailed description of the present invention it may be noted that it consists of a novel core and rotor and a method of making them. A rotor constructed in accordance with the invention is both readily and economically constructed and it can be both statically and dynamically balanced. A complete static balance can readily be achieved by taking a stack of laminations punched the same way from a strip of laminated material and turning one-half of the stack 180 degrees relative to the other. Static unbalance due to nonuniformity of the winding to be placed upon the core can be corrected for by adding weight to the laminations by making the latter heavier at the point where the winding is lightest. Dynamic balance may be achieved by taking one of the halves of punchings and dividing it into two parts and placing these two parts at opposite sides of the other half of the total number of punchings. Both static and dynamic balance can be achieved by reversing every other lamination so that the heavier portions of adjacent laminations are located substantially diametrically opposite each other. Also, where the rotor has associated with it windings heavier at a certain region, the core laminations can be made heavier at a certain region to compensate for rotor unbalance which would otherwise result. If it is necessary to correct for eccentricity of the outside and inside diameters of the laminations, the outside diameter can be ground at least partially to correct for the resulting unbalance. However, the unbalance of the eccentricity can, of course, be eliminated or minimized by holding the center hole, the slots and the outside diameter very close to exact concentricity.

While specific embodiments of the present invention have been disclosed and described in detail, it should be understood that the details thereof are not to be construed as limitative of the invention except in so far as set forth in the accompanying claims.

Having described my invention, what I claim as new and useful and desire to secure by Letters Patent of the United States is:

1. A laminated rotor core for receiving a winding having a relatively light portion, including in combination a plurality of stacked generally circular laminations having generally radial teeth defining peripheral slots for receiving the winding, the laminations having grain structures running in predetermined directions, at least one of the teeth in each lamination positioned generally along a diameter parallel with the direction of the grain being shaped for relatively heavier weight to receive the light portion of the winding, the laminations being stacked with their grain directions generally parallel and their heavier teeth aligned, and approximately half in number of the laminations being reversed with respect to the remaining half about diameters parallel with the grain directions so that any cross-grain taper which may exist in the thickness of the laminations runs in opposite directions in the respective halves.

2. A laminated rotor core adapted to receive a winding having a relatively light portion, comprising a plurality of stacked laminations, the laminations having generally aligned teeth defining slots therebetween for receiving the winding, at least one of the teeth being shaped for relatively heavier weight than the others for receiving the light portion of the winding.

3. In a rotor, a laminated core comprising a plurality of stacked laminations, the core having a plurality of generally radial teeth defining peripheral slots therebetween, an adjacent pair of teeth being shaped for heavier weight than the others, and a winding having starting and finishing ends and being relatively light in the neighborhood of the ends, the ends being positioned in the slot between the heavier teeth, for balancing the rotor.

HORACE M. NORMAN.

REFERENCES CITED

The following references are of record in the file of this patent:

UNITED STATES PATENTS

| Number | Name | Date |
| --- | --- | --- |
| 1,809,197 | Fendrich | June 9, 1931 |
| 1,958,982 | Wintercorn | May 15, 1934 |